United States Patent
Kehm

(10) Patent No.: US 9,338,585 B2
(45) Date of Patent: May 10, 2016

(54) AUTOMATICALLY CONNECTING A USER EQUIPMENT DEVICE WITH A PARTNER DEVICE

(71) Applicant: Telefonaktiebolaget L M Ericsson (publ), Stockholm (SE)

(72) Inventor: Michael Kehm, Mountain View, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 11 days.

(21) Appl. No.: 14/299,930

(22) Filed: Jun. 9, 2014

(65) Prior Publication Data
US 2015/0358760 A1 Dec. 10, 2015

(51) Int. Cl.
*H04W 4/02* (2009.01)
*H04W 4/00* (2009.01)
*H04W 76/02* (2009.01)
*H04W 4/04* (2009.01)
*H04W 8/00* (2009.01)

(52) U.S. Cl.
CPC .............. *H04W 4/008* (2013.01); *H04W 4/026* (2013.01); *H04W 4/04* (2013.01); *H04W 8/005* (2013.01); *H04W 76/023* (2013.01)

(58) Field of Classification Search
CPC H04W 4/02; H04M 2215/32; H04M 2207/18
USPC ............. 455/404.2, 414.2, 457, 456.1, 456.2, 455/226.2; 340/407.1, 573.1
See application file for complete search history.

(56) References Cited

U.S. PATENT DOCUMENTS

| 8,712,433 | B1 * | 4/2014 | Stensland | ............... G01S 3/043 455/404.2 |
| 8,970,355 | B1 * | 3/2015 | Stensland | ............... H04B 3/36 340/407.1 |

(Continued)

FOREIGN PATENT DOCUMENTS

WO 2008152531 A1 12/2008

OTHER PUBLICATIONS

IEEE 802.11-2012, "Part 11: Wireless LAN Medium Access Control (MAC) and Physical Layer (PHY) Specifications", *IEEE Standard for Information technology; Telecommunications and information exchange between systems; Local and metropolitan area networks; Specific requirements*, (Mar. 29, 2012), 2793 pages.

(Continued)

*Primary Examiner* — Minh D Dao
(74) *Attorney, Agent, or Firm* — Nicholson De Vos Webster & Elliott, LLP

(57) ABSTRACT

A User Equipment (UE) device of a user may automatically determine an intended partner device with which the user desires to interact by determining its own UE orientation value and receiving a beacon signal that includes a device identifier of a candidate partner device and a device orientation value that indicates an orientation of the candidate partner device. The signal strength value for the beacon signal is determined. The UE selects the candidate partner device as the intended partner device based on at least the signal strength value, the device orientation value that indicates the orientation of the candidate partner device, and the UE orientation value. The UE then transmits a message to the intended partner device using the device identifier of the candidate partner device.

21 Claims, 14 Drawing Sheets

(56) References Cited

U.S. PATENT DOCUMENTS

| | | | |
|---|---|---|---|
| 2009/0195402 A1* | 8/2009 | Izadi | H04W 76/023 340/686.6 |
| 2011/0106954 A1 | 5/2011 | Chatterjee et al. | |
| 2013/0304859 A1 | 11/2013 | Gassion et al. | |
| 2013/0307729 A1* | 11/2013 | Stensland | G01S 3/14 342/386 |

OTHER PUBLICATIONS

Emmanuel Marilly et al., "WellCom: When Mobile Terminals Meet Television," Sep. 15, 2009, pp. 47-51, 2009 Third International Conference on Next Generation Mobile Applications, Services and Technologies, IEEE.

* cited by examiner

AUTOMATICALLY CONNECTING A USER EQUIPMENT DEVICE WITH A PARTNER DEVICE

FIELD

Embodiments of the invention relate to users interacting with devices on a network; and more specifically, for automatically connecting a user equipment device with a partner device.

BACKGROUND

It may be desirable for content providers to be able to customize content for one or more particular viewers to display on a television (TV) set or other display device. Customizing content displayed on a television screen located where multiple people may view simultaneously or sequentially over time may be difficult because the display may be shared among multiple people with disparate preferences and demographics. Different viewers having different preferences may watch the television at different times or together.

Face recognition is one way to identify one or more viewers positioned in front of a television screen. As an example, Microsoft's® Kinect® uses this method of identifying viewers. Kinect® works with the Xbox® and Windows®-based devices to identify users through optical means. However, providing such optical facial recognition is expensive, and adding such capability to a television, set top box (STB), or game console may increase the manufacturing price on the order of several hundred dollars per device. A less expensive solution is needed for ubiquitous use.

TV and STB remote controls operate using an infrared (IR) signal between the remote control and the TV or STB. IR is directional and requires line of sight. However, most people do not have a remote control device that can provide identity or personalized information in the IR signal that could be used to customize content for the particular viewer(s). Remote control devices are typically shared among viewers and stay in the vicinity of the device they control; they do not represent an individual person.

Whereas most people carry a mobile phone with them that has been configured with personal information, mobile phones are not generally configured with an IR output device. Mobile phones may have other wireless connection capabilities such as Bluetooth. Bluetooth is a wireless technology standard for exchanging data over short distances (using short-wavelength Ultra High Frequency (UHF) radio waves in the industrial, scientific and medical (ISM) band from 2.4 to 2.485 GHz) from fixed and mobile devices. However, unlike using infrared radiation (IR) such as is used in TV/VCR/STB/DVD device remote controls, Bluetooth does not require line of sight, and may penetrate walls, floors, and ceilings.

SUMMARY

Both content providers and viewers benefit from the ability to customize content for one or more particular viewers to display on a television (TV) set or other display device. A User Equipment (UE) of a user may automatically determine an intended partner device with which the user desires to interact. The UE may determine a UE orientation value for the UE. In addition, the UE may receive a beacon signal from a candidate partner device in which the beacon includes a device identifier of the candidate partner device and a device orientation value that indicates an orientation of the candidate partner device. The beacon's signal strength value may be determined, and an intended partner device selected based at least on the signal strength value. Determining the intended partner device may also consider the device orientation value that indicates the orientation of the candidate partner device and the UE orientation value. A message may be transmitted to the intended partner device using the device identifier of the intended partner device.

In an embodiment, the UE may also determine a UE elevation value, and the beacon signal may also include a device elevation value that indicates an elevation of the candidate partner device. Determining the intended partner device may also consider the device elevation value that indicates the elevation of the candidate partner device and the UE elevation value.

A UE is operative to automatically determine an intended partner device with which a user desires to interact. The UE may comprise one or more network interfaces operative to receive beacon signals, wherein each of the beacon signals may include a device identifier of a corresponding candidate partner device and a device orientation value that indicates an orientation of the corresponding candidate partner device. The UE may further comprise a compass operative to determine orientations of the UE, one or more processors coupled to the one or more network interfaces, the compass, and a non-transitory computer-readable storage medium. The non-transitory computer-readable storage medium stores instructions that, when executed by the one or more processors, cause the one or more processors to perform operations comprising determining a UE orientation value based on an orientation of the UE determined by the compass. A candidate partner device may be selected as the intended partner device based at least on a signal strength value of a beacon signal, the device orientation value included in the beacon signal, and the UE orientation value. The UE may further perform operations causing one of the one or more network interfaces to transmit a message to the intended partner device using the device identifier included in the beacon signal.

In an embodiment, the UE may also comprise an air pressure sensor operative to determine elevations of the UE, and the beacon signal may also include a device elevation value that indicates an elevation of the corresponding candidate partner device. The one or more processors may also be coupled to the air pressure sensor. The non-transitory computer-readable storage medium may store instructions that cause the one or more processors to determine a UE elevation value based on an elevation of the UE determined by the air pressure sensor. A candidate partner device may be selected as the intended partner device also based on the device elevation value included in the beacon signal and the UE elevation value.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
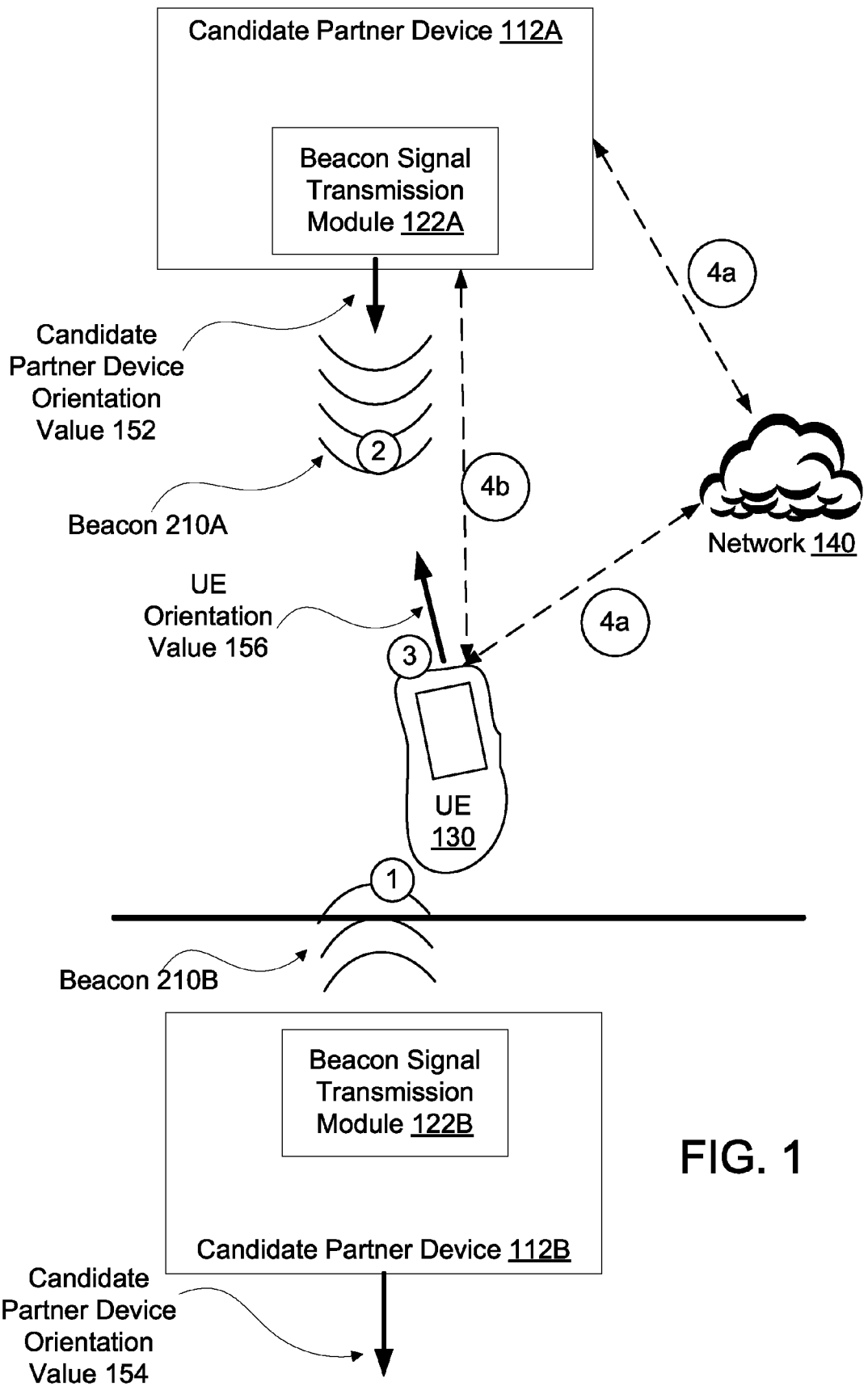
FIG. 1 illustrates a UE selecting and interacting with one of two candidate partner devices, each candidate partner device associated with and identified by a beacon signal within an exemplary network, according to some embodiments of the invention.

The following description describes methods and apparatus for automatically determining an intended partner device with which a user may desire to interact. In the following description, numerous specific details such as types and inter-relationships of system components and logic partitioning/integration choices are set forth in order to provide a more thorough understanding of the present invention. It will be appreciated, however, by one skilled in the art that the invention may be practiced without such specific details. In other instances, control structures and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for automatically connecting a user equipment device with a partner device is described. A user equipment device (sometimes referred herein as a "UE") receives a signal from a candidate partner device that includes an identifier of the candidate partner device and an orientation value of the candidate partner device that indicates the orientation of the candidate partner device. Using the strength of the signal received from the candidate partner device, the orientation value of the candidate partner device, and an orientation value of the UE, the UE registers or connects with the partner device. For example, the UE determines if it is in range of the candidate partner device (e.g., whether the strength of the signal received from the candidate partner device is above a predefined threshold) and determines whether the UE is facing the candidate partner device (or sometimes referred to as "pointing" towards the candidate partner device) through a comparison of the orientation value of the UE and the orientation value of the candidate partner device. The UE device selects the candidate device that has the best signal strength and orientation relative to the UE device (if there are multiple candidate peer devices) and registers or connects with that candidate device. In some embodiments the received signal may also include an elevation value of the candidate partner device and the UE may use that elevation value along with an elevation value of the UE when selecting a partner device.

Once connected with the partner device, the UE device and partner device may interact. By way of example, the partner device may customize content based on data of the UE device. For example, in a specific embodiment, the partner device may be a set top box (STB) or other device with STB functionality that receives personalized data from the UE device such as an identity of the user using the UE device and customize the interface or other content displayed through the partner device using that information. As another example, the UE device may transmit messages to the partner device to instruct the partner device to take certain actions. For example in a specific embodiment, the partner device may be a STB or other device with STB functionality and the UE device may control operation of the STB (e.g., change channels, browse a guide, record, etc.).

A UE is a computing device such as a handheld computer, tablet, smart phones, laptop, etc. A UE may be configured for the user that carries the UE. There are several terms used herein to refer to the person who owns and carries a UE, who is assumed to be the same person who intends to interact with the partner device and/or view the display of an entertainment system. The UE may come equipped with various wireless network capabilities that would allow the UE to discover and interact (partner) with at least one partner device that is a component of an entertainment system.

The combination of television (TV), set top box (STB), and viewer recognition support is collectively referred herein as an "entertainment system". These components work together to display content targeted for a particular viewer. However, the targeted content need not be strictly for entertainment purposes. For example, such a system may include an overhead projector in a conference room of a business. Viewer recognition support refers to the ability to recognize the identity of the viewer for the purpose of access control and customizing content for the viewer. When describing the discovery and selection of an entertainment system, the term "user" may be used referring to the person's relationship to the UE that represents the user's identity. When describing a person's identity for the purpose of custom content generation, "viewer" may be used. However, it is assumed throughout that the viewer is the same person as the user, and so the terms are used interchangeably.

In addition to a TV or STB, a Universal Serial Bus (USB) stick may be plugged into a USB port on either the TV or the STB to expand the off-the-shelf capability of the entertainment system. It should be clear to a person of ordinary skill in the art that other communication port form factors such as HDMI compatible sticks, Ethernet compatible sticks or power plug adapters may also be used to expand off-the-shelf functionality of the entertainment system.

The entertainment system provides various functionality including identifying one or more users and retrieving information about the one or more users such as preferences (e.g. educational, documentary, biography, other non-fiction programming), viewing history (e.g. a log of shows watched over time), viewing patterns (watches the news between 7-9 am), and demographics (e.g. age, sex, race, income bracket) that may be used for purposes of customizing displayed content. The candidate device may determine locally or with the help of a remote server how to customize content to display based on the viewer-specific information. This functionality may be provided in the entertainment system by a variety of configurations of devices that represent different embodiments of the invention.

A component of the entertainment system, e.g., a partner device, may interact with the UE to receive the viewer identity information. In one embodiment of the invention, a user's personal device discovers, selects, and partners with a partner device within the entertainment system to enable the entertainment system to generate custom content for one or more viewers. When more than one partner device is discovered within a local area, the discovery process may further select one of the multiple partner devices based on which partner device is in reasonable viewing range of the viewer. When a partner device detects a viewing audience of more than one person, the viewer information for all viewers may be considered when generating custom content.

A partner device may be discovered by a UE by receiving a signal, such as a wireless signal, announcing the presence of the partner device. FIG. 1 illustrates a UE discovering two candidate partner devices, and selecting and interacting with one of them. Each candidate partner device may be associated with and identified by a beacon signal within an exemplary network, according to some embodiments of the invention. The circled numbers in the figure provide a reference to and identify the order of different points of the illustrated process. For example, circle 1 is the first illustrated step towards selecting and interacting with an appropriate partner device.

FIG. 1 shows Beacon Signal Transmission Modules 122A and 122B each emitting a beacon signal associated with candidate partner devices 112A and 112B respectively. At circle 1, UE 130 receives the Beacon Signal 210B from Beacon Signal Transmission Module 122B. At circle 2, UE 130 receives the Beacon Signal 210A from Beacon Signal Transmission Module 122A.

A short-range beacon may be used for identifying entertainment systems within the receiving range of the wireless signal. An example of a short-range wireless communication technology is Bluetooth, although the beacon may be transmitted on any short-range communication medium such as infrared or Wi-Fi.

Bluetooth is a wireless standard that is available on most mobile UE devices. Thus, in an embodiment, the ability to recognize the identity of a viewer (viewer recognition capability) may rely on a Bluetooth interface. Because of the limited range of Bluetooth, the location of a partner device relative to a UE may be inferred by the signal strength of the Bluetooth signal that emanates from the candidate partner device and is received by the UE. However, unlike using infrared radiation (IR) such as is used in TV/VCR/STB/DVD device remote controls, Bluetooth does not require line of sight, and may penetrate walls, floors, and ceilings. Consider an apartment within an apartment building having neighboring apartments sharing at least two walls, apartments across a hallway, and apartments directly above and below (i.e., sharing floor/ceiling). Every such apartment may have a Bluetooth-enabled entertainment system. A UE in one apartment may receive one or more Bluetooth signal beacons identifying an entertainment system located in a neighboring apartment. Thus, even if the apartment in which a viewer resides only has one entertainment device, the user's UE may receive information about devices nearby, and may need to determine which device, if any, is a reasonable viewing device for the user.

Most Bluetooth applications are used indoors, where attenuation of walls and signal fading due to signal reflections will cause the range to be far lower than the specified line-of-sight ranges of the Bluetooth products. The Bluetooth capability in a UE may be a battery-powered Class 2 device that is useful for mobile devices. Class 2 Bluetooth has a range of about 10 m. The Bluetooth capability within an entertainment system may be Class 1 with a range of about 100 m because in an embodiment, the entertainment system is stationary and may receive alternating current (AC) power from a wall socket. However, when a Class 2 device interacts with a Class 1 device, the lower powered device tends to set the range limit. Thus, in this embodiment, a UE may receive beacon signals from entertainment systems residing a little over 10 m away.

The Bluetooth protocol for exchanging data between two endpoints includes a pairing step that creates a connection between the endpoints before data is exchanged. However, using Bluetooth as a beacon does not require exchanging information; the information is broadcast in one direction only. In an embodiment in which the partner device is stationary so that the elevation and orientation information does not change over time, the beacon may be statically configured to emit elevation and orientation information embedded in the name of the device, e.g. Partner_device_11223ph_90E. No direct response to the beacon signal is expected from a beacon receiver. Thus, to use a Bluetooth beacon does not require a pairing step. It also does not require the receiver to identify itself to the beacon transmitter. This is convenient for applications interfacing with the general public, such as TVs in airport gate lounges or the information displays in a department store.

In an environment where a viewer may be located proximate to multiple entertainment systems, viewer recognition support may also include predicting which entertainment system has the highest probability of being selected by the user for interaction from potentially multiple nearby devices. For example, a person in an apartment on the second floor of a three-story apartment building may desire to watch the (single) television in that apartment, even though that person may be physically closer to the entertainment systems of neighbors on the other side of a shared wall, floor, or ceiling. Similarly, in a department store with a screen in each department for advertising specials relevant to the goods sold in that department, for maximum effectiveness, users located within a particular department should partner with the screen in that same particular department. Even though the user may be in reasonable viewing distance of more than one screen (for example, at the border of two departments), there needs to be a way to ensure that the user partners with the appropriate display.

Comparing the orientation of the UE with the orientation of a potential partner device may prevent partnering with a device that the user is not facing. Similarly, comparing the elevation of the UE with the elevation of a potential (candidate) partner device may prevent partnering with a device that is located on a floor above or below where the user is located. The information received from a beacon signal, transmitted on behalf of each candidate partner device, allows selection of a suitable intended partner device as well as identifying the device for use in transmitting a message that is addressed to the selected partner device. The signal strengths of different beacons may be compared against each other as well as against an absolute threshold when considering suitable candidate partner devices. Each device orientation and/or elevation may be compared to the UE orientation and/or elevation to aid in selecting the most reasonable candidate. In an embodiment, both orientation and elevation of the UE relative to the partner device may be used for selecting the most reasonable candidate. In another embodiment, only one of the relative orientation or elevation may be considered.

At circle 3, UE 130 examines and analyzes data transmitted in each received beacon signal, and selects Candidate Partner Device 112A based on the information received in the beacon signal emitted from Beacon Signal Transmission Module 122A.

Figure 6:
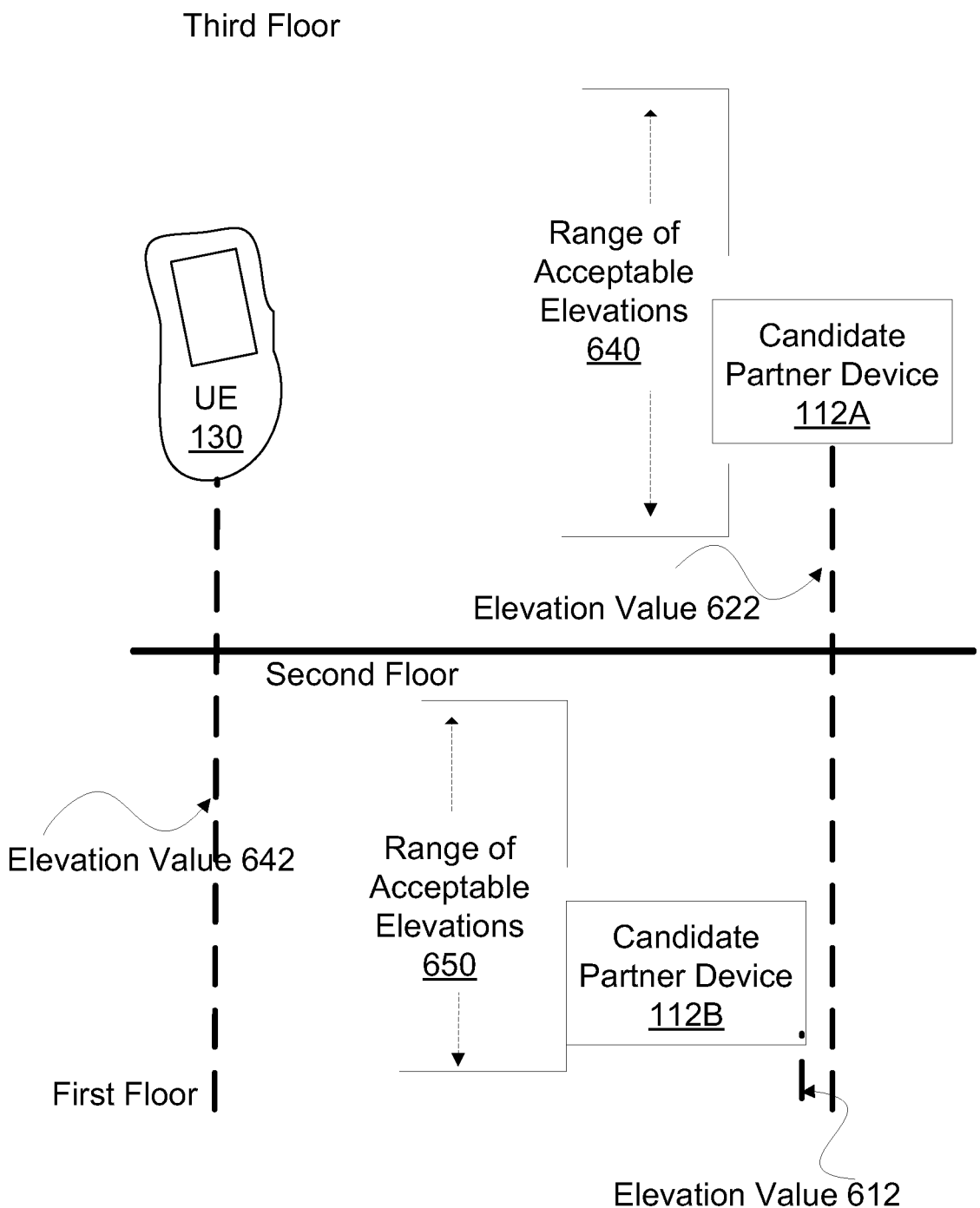
FIG. 6 is a block diagram that illustrates an embodiment of comparing a UE elevation value with a candidate partner device elevation value.
Figure 7:
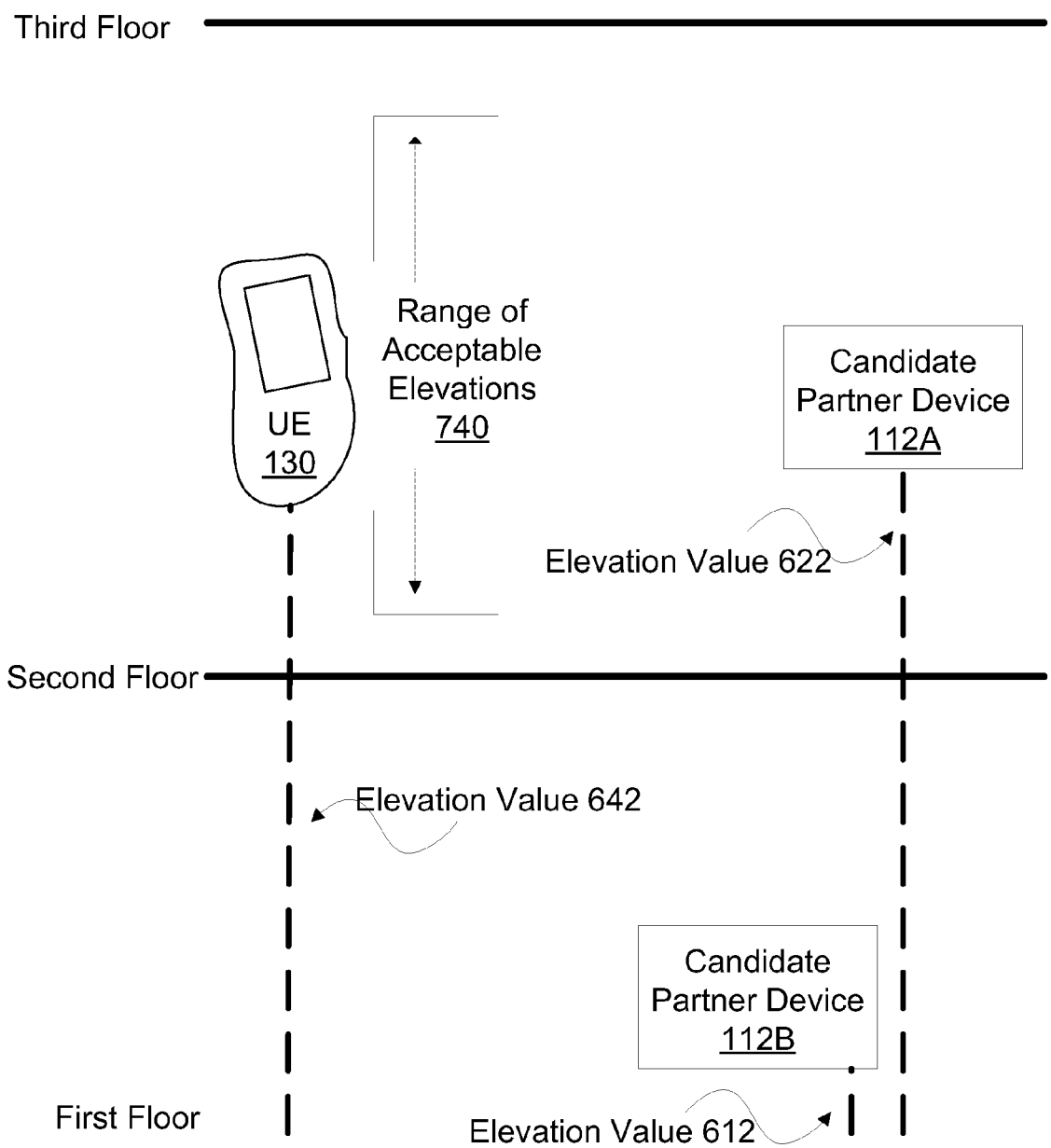
FIG. 7 is a block diagrams that illustrates an embodiment of comparing a UE elevation value with a candidate partner device elevation value.

UE Orientation Value 156 indicates the direction that the UE is facing, Candidate Partner Device Orientation Value 152 indicates the direction that the Candidate Partner Device 112A is facing, and Candidate Partner Device Orientation Value 154 indicates the direction Candidate Partner Device 112B is facing. FIG. 1 illustrates UE 130 and Candidate Partner Device 112A facing each other and UE 130 facing away from Candidate Partner Device 112B. Examination and analysis of the beacon information may include comparing UE Orientation Value 156 with Candidate Partner Device Orientation Values 152 and 154 to determine with which partner devices, if any, the UE may reasonably interact. Examination and analysis of the beacon information may also include comparing UE elevation information to elevation information about the candidate partner devices as illustrated in FIGS. 6 and 7.

Once the most reasonable entertainment system is selected as an intended viewing device, the identification information of the entertainment system received with the representative beacon supplies the UE with an identifier that may be used for locating and partnering with the intended partner device. The identification information of the entertainment system may be a name that may be resolved to a network address (e.g., MikesTV) that may be resolved using a directory or name service. The device identification may be an encoded name (such as a URL, e.g. http://mikestv.net) that may be mapped to a network address. Alternatively, the information may be a network address for one or more wireless networks (e.g. 192.168.0.3) that may be used directly without needing further resolution.

The UE may then use the network address to send a message to the intended partner device to provide viewer identification information, viewer preferences, and/or viewer commands.

Upon selecting Candidate Partner Device 112A as a reasonable intended partner device, an identifier of Candidate Partner Device 112A is retrieved from the Beacon Signal 210A information and the identifier is resolved to an address to which a message may be sent. At circles 4a and 4b of FIG. 1 the process may take alternate paths. In an embodiment, at circle 4a, a message addressed to the intended partner device may be transmitted over a network such as Wi-Fi. The network may be wired or wireless and may be routed over a local area network (LAN). In another embodiment, at circle 4b of FIG. 1, the UE may transmit a short-range wireless peer-to-peer message. The message may be transmitted using the same wireless interface as was used to receive the beacon signal, or a different wireless interface may be used to transmit the message.

The transmitted message may contain viewer identification information, such as the UE owner's name, that may allow the intended partner device to retrieve user profile information for use in customizing the content displayed to the viewer. Identity information may be configured into a personalized device such as a mobile phone or tablet. Thus, a user's identity information may be easily accessible from the user's personalized device without requiring any additional device or configuration.

A wireless beacon may emit signals in all directions. Thus, as seen in FIG. 1, the Beacon Signal Transmission Module 122B may emit a signal from the back of the device, to the front as shown for Beacon Signal Transmission Module 122A, and to both sides as well. The example shown in FIG. 1 explains that the UE may receive beacon signals from devices that are not in a reasonable position to be viewed. However, in an embodiment, the beacon transmitter may be tuned to only emit signals within a particular narrow angle, most likely facing the front of the display (as shown in circle 2). The effect of narrowing the angle through which beacon signals may be transmitted reduces the locations in the room that may receive a beacon signal of sufficient signal strength. In an embodiment, all UEs receiving a beacon signal of sufficient strength and associated with a particular orientation may all be considered to be in a reasonable position or all considered to be in an unreasonable position for viewing. Thus, by strategically selecting the angle for emitting the beacon signal, the signal strength and the orientation may be sufficient to determine whether the user is within reasonable viewing range in the horizontal plane.

Figure 2:
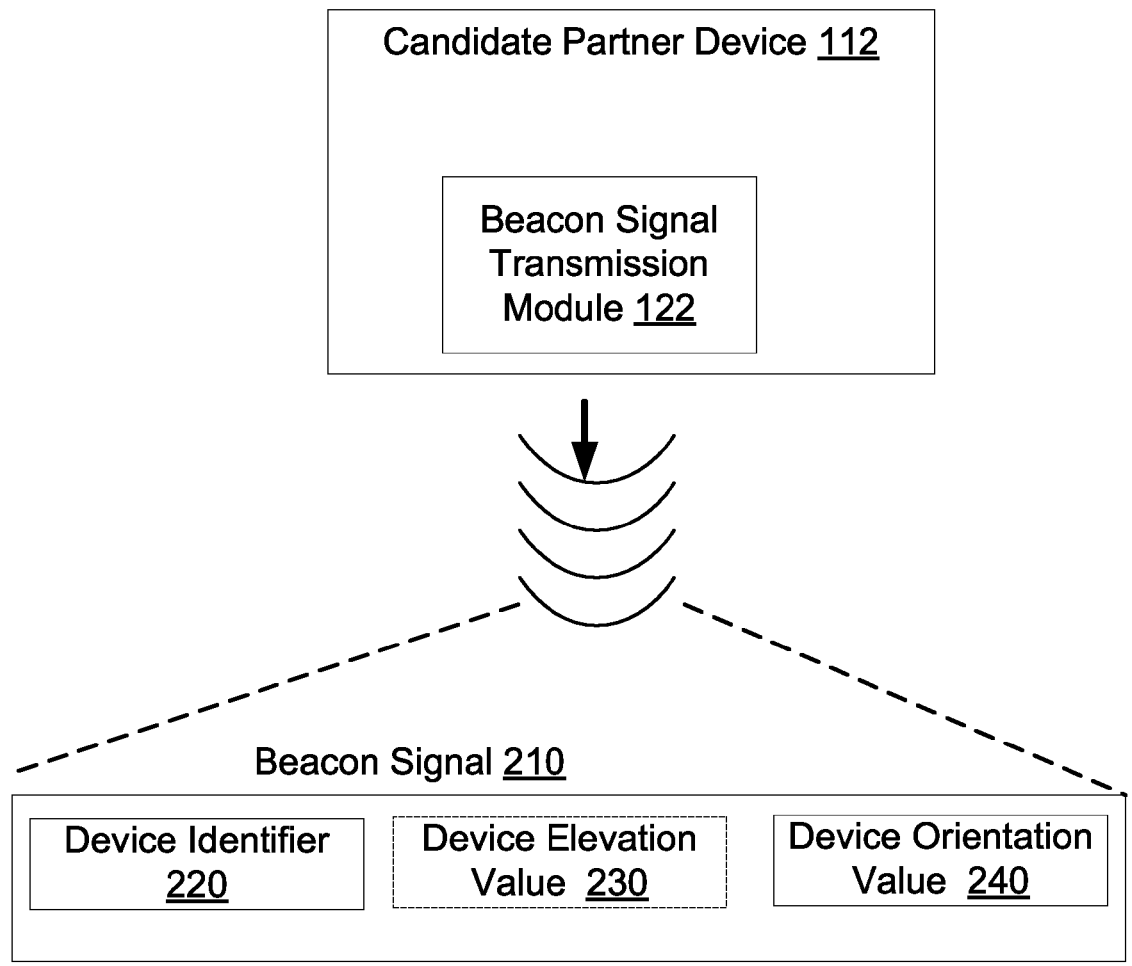
FIG. 2 is a block diagram illustrating information that may be included in a beacon signal, according to an embodiment of the invention.
Figure 2:
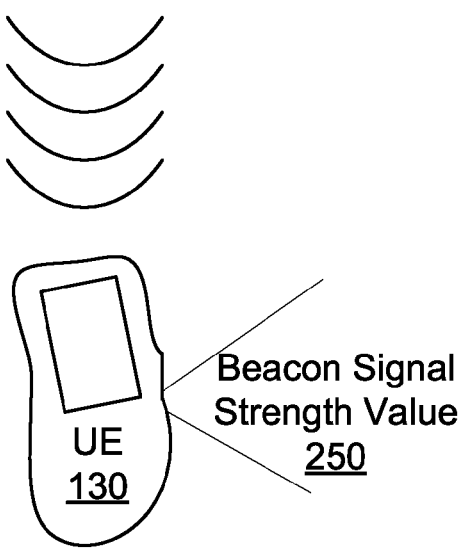

The location (including distance and orientation) of a viewer relative to the entertainment system may be inferred in part based on the signal strength of the beacon signal that is associated with a particular entertainment system, as received by the UE. Because signal strength alone may only hint at whether a viewer is facing a candidate partner device, to reliably identify which partner device a viewer may reasonably view may require additional knowledge of the elevation and/or orientation of the viewer relative to the entertainment system display. FIG. 2 is a block diagram illustrating information that may be included in a beacon signal, according to an embodiment. A Beacon Signal 210 represents the content of beacon signals emitted from all Beacon Signal Transmission Modules 122 and includes information about the corresponding Candidate Partner Device 112. Once the UE receives a Beacon Signal 210, the UE may determine a Beacon Signal Strength Value 250 of Beacon Signal 210 as an indicator of proximity (signal is stronger when the UE is close to the Candidate Partner Device 212). A signal strength may be determined for each distinct beacon signal received at the UE. Beacon Signal 210 may include a Device Identifier 220 that may comprise a name, address, or other location identification information that may be used to establish communication with the associated entertainment system if selected for partnering. The beacon signal may also include a Device Orientation Value 240 indicating in which direction the partner device is facing. In an embodiment, the beacon signal includes a Device Elevation Value 230 indicating the elevation of the partner device. Elevation information may help to select among candidate partner devices that are located on different floors of a building. Orientation may be important because even if a user is standing directly in front of an entertainment system, if the user is facing away from the screen, that screen may not be considered to be viewable.

Figure 3:
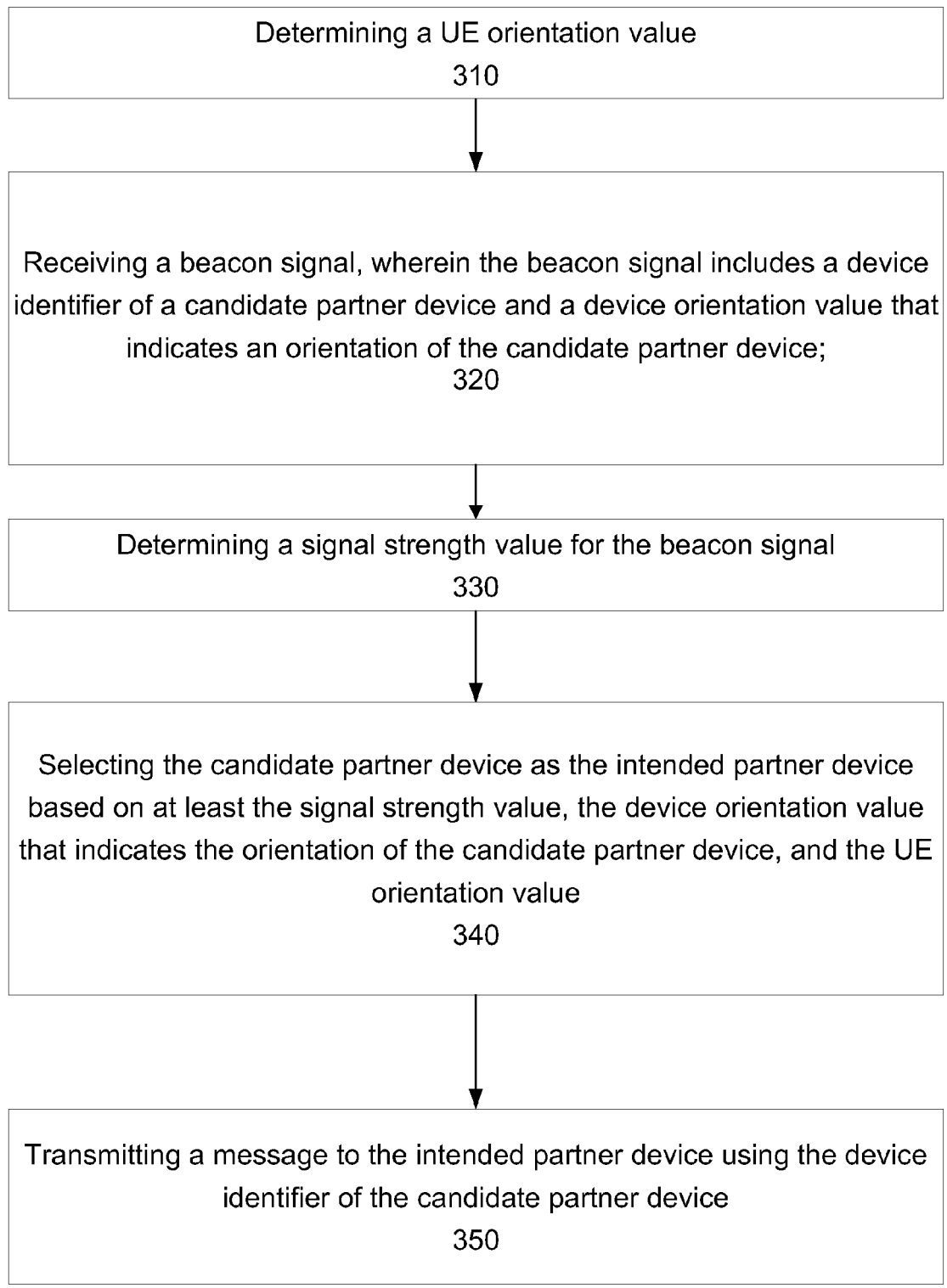
FIG. 3 is a flowchart illustrating embodiments of method steps.

FIG. 3 is a flowchart illustrating exemplary operations for a UE to select an intended partner device and provide the selected partner device with viewer identification information according to one embodiment. The operations in this and other flow diagrams are described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Starting in Step 310, the UE determines a value to indicate the horizontal orientation of the UE. In an embodiment, the horizontal orientation value may be obtained through an electronic compass device included in the UE. In an embodiment, the UE may also determine a value to indicate the vertical elevation obtained through an air pressure sensor included in the UE. Next, in Step 320, the UE receives a beacon signal including information about a candidate partner device associated with the beacon signal. In particular, the beacon signal may contain information about the candidate partner device such as: a device identifier from which a network address may be ascertained, a value indicating the orientation of the device, and optionally a value indicating the elevation of the device. The flow then proceeds to Step 330. In Step 330, the UE determines the strength of the beacon signal. In an embodiment, a network interface in the UE may determine the beacon signal strength. The signal strength of the beacon may provide a clue as to its location relative to the UE. For example, a beacon signal received through a wall, floor, or ceiling is likely to be weaker than a signal received without traversing such a barrier. In an embodiment, the UE may be configured with at least a low threshold value that the received beacon signal strength must be above for its corresponding candidate partner device to be considered reasonable for viewing. In an alternative embodiment, a received signal may be required to have a strength that lies within a configured range of signal strengths.

Proceeding to Step 340, the UE selects an intended partner device based at least on information including the signal strength of the beacon signal, and the orientation value for the UE, and the orientation values retrieved from each corresponding beacon. The orientation information received in the beacon signal may be compared with the orientation information of the UE to determine whether the viewer is facing the candidate partner device so that content may be viewed (the orientation of the UE is assumed to be the same as the orientation of the viewer). If elevation information is available, the elevation information received in the beacon signal may be compared with the elevation information of the UE to determine whether the UE and the candidate partner device are on the same floor. This may prevent the UE from choosing to partner with the upstairs neighbor's entertainment system.

Next, in Step 350, the UE transmits a message to the selected intended partner device that includes viewer information. The message may be addressed directly to the device identifier, or the device identifier may be used to look up or otherwise determine a network address for the intended partner device. The network for sending the message may be Bluetooth, but need not be. Any wireless network such as Wi-Fi or cellular network may be used to communicate viewer identification information from the UE to the selected partner device.

The viewer identification information in the transmitted message may include user preference and/or demographic information. Alternatively, the viewer information may include a viewer identifier that may be used to find user preference, demographics, and viewing history from a repository of stored viewer information. The repository may reside locally within the entertainment system or the viewer information may be retrieved over a network from a repository on a remote server.

In an embodiment, transmitting viewer identification information may be included as a session initiation analogous to a log on. In an embodiment, the UE may transmit a session termination message upon power down of the device or when the UE fails to receive a beacon from the partner device having sufficient signal strength.

In an embodiment, the UE may control a partner device without first initiating a session. In an embodiment, the UE may include in the control message orientation and elevation information that a partner device may use to determine whether to respond to the control message. In that way, a partner device may only be controlled by a UE that is pointing to it.

In another embodiment, the viewer identification information used for customizing the content that is displayed may be used for access control regarding performing operations on the entertainment system. For example, the system may only allow certain individuals or those assigned a designated role to change the channel, request a video-on-demand, or change parental controls. Control messages for performing these kinds of operations may be sent from the UE to the entertainment system subsequent to session initiation.

Figure 4:
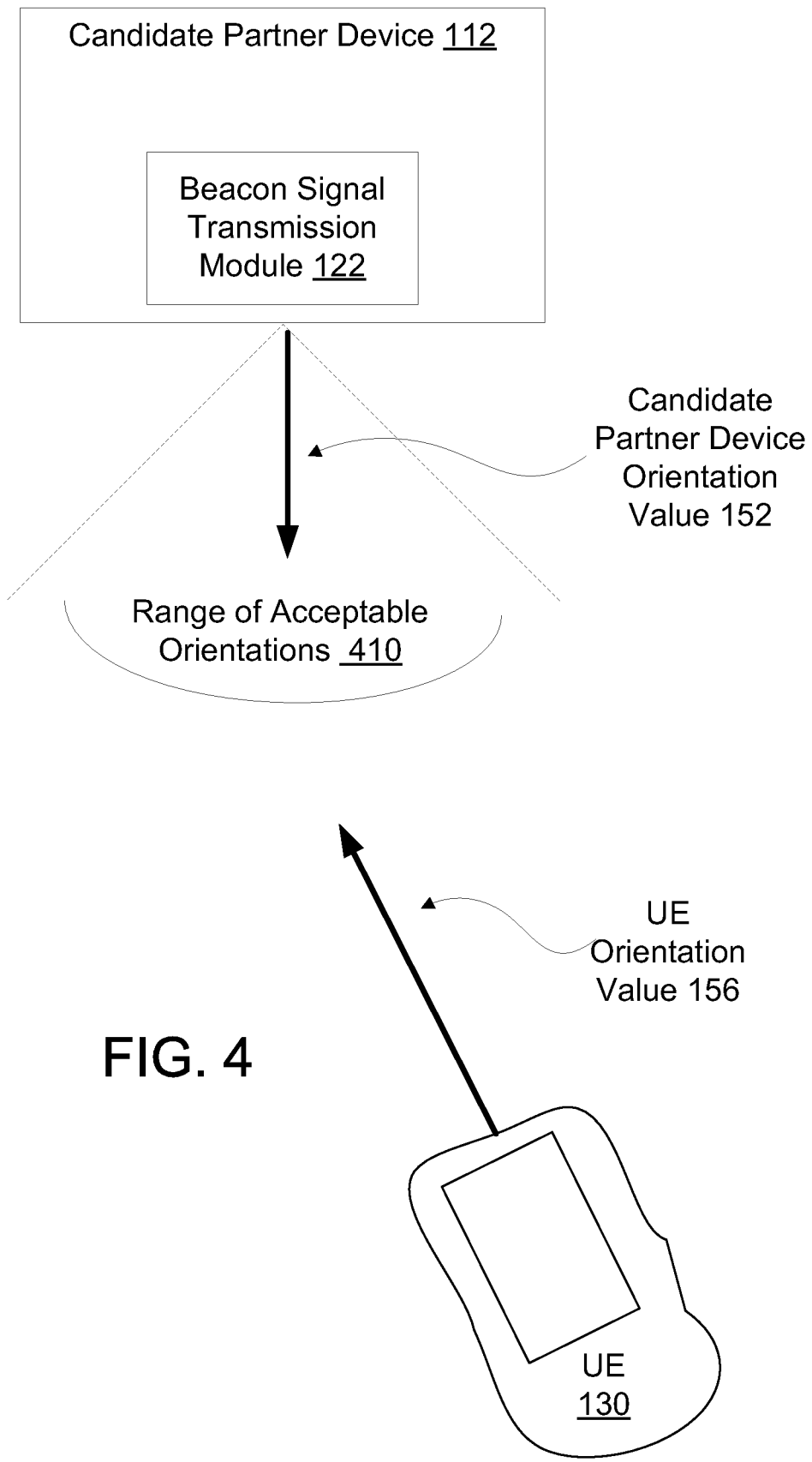
FIG. 4 is a block diagram that illustrates an embodiment of comparing a UE orientation value with a candidate partner device orientation value.
Figure 5:
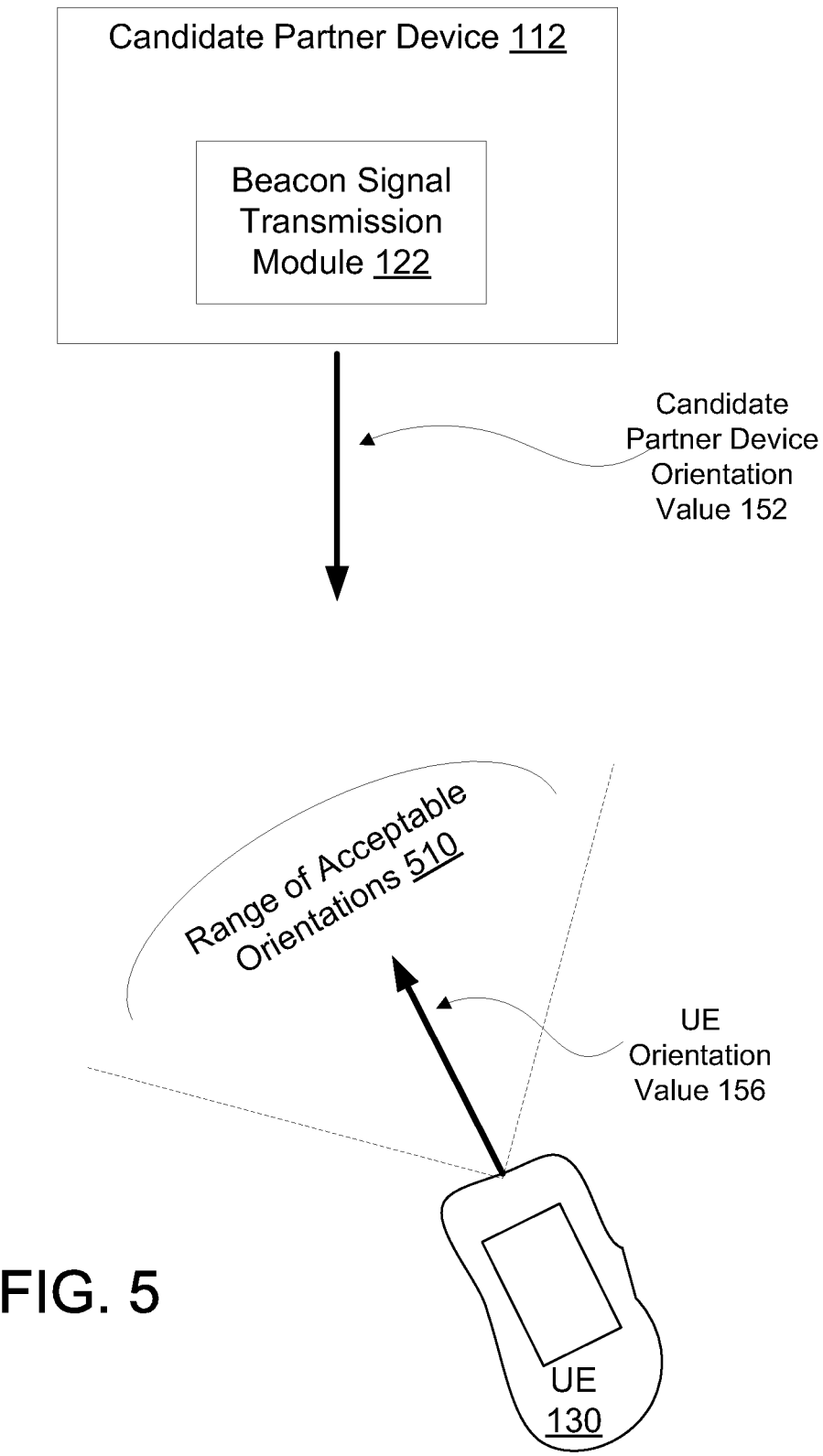
FIG. 5 is a block diagram that illustrates an embodiment of comparing a UE orientation value with a candidate partner device orientation value.

FIGS. 4 and 5 are block diagrams that illustrate alternate embodiments of comparing a UE orientation value with a candidate partner device orientation value for any Candidate Partner Device 112 (though the values in the example are the values corresponding to Candidate Partner Device 112A). In an embodiment of the invention, the orientation may be a compass reading measured in degrees, which may provide an indication of what direction the screen is facing.

To determine that the UE and the candidate partner device are facing each other directly, the orientation of one of the values needs to be adjusted by 180°. For example, if the Candidate Partner Device Orientation Value 152 were 270°, the value may need to be adjusted to 90° before comparing against an unadjusted UE Orientation Value 156. Alternatively, if the UE Orientation Value 156 is 90°, the UE Orientation Value 156 may be adjusted to 270° before comparing against an unadjusted Candidate Partner Device Orientation Value 152.

FIG. 4 illustrates comparing the UE Orientation Value 156 of UE 130 with a Range of Acceptable Orientations 410 that is determined based on the Candidate Partner Device Orientation Value 152. Continuing with the above example, if the Candidate Partner Device Orientation Value 152 is adjusted to 90°, then the Range of Acceptable Orientations 410 may be determined based on 90° and a low and high threshold value. The lower bound of the range of acceptable orientations may be determined by the difference between the Candidate Partner Device Orientation Value 152 and a low threshold value. For example, if the Candidate Partner Device Orientation Value 152 were 90° and a low threshold value were configured to be 20°, the lower bound of the Range of Acceptable Orientations 410 may be 70°. Similarly, if a high threshold value were configured as 25°, the upper bound of the Range of Acceptable Orientations 410 may be the sum of the Candidate Partner Device Orientation Value 152 and the high threshold value (e.g. 90°+25°=115°). To determine whether the UE is facing within that range of acceptable orientations, the UE Orientation 156 may be compared against the range of [70° . . . 115°]. If the UE Orientation Value 156 is between 70° and 115°, then the UE and the candidate partner device may be considered to be facing one another. If the UE Orientation Value 156 does not lie within the acceptable orientation range, then the candidate partner device is not considered to be in a reasonable viewing position.

FIG. 5 illustrates comparing the Candidate Partner Device Orientation Value 152 with a Range of Acceptable Orientations 510 that is determined based on the UE Orientation Value 156. The Candidate Partner Device Orientation Value 152 may be compared with the range of values, where the lower bound of the range may be determined by the difference between the adjusted UE Orientation 156 and a low threshold value, and the upper bound of the range may be determined by the sum of the adjusted UE Orientation Value 156 and a high threshold value.

A person of ordinary skill in the art will appreciate that either the UE orientation value or the candidate partner orientation value may be adjusted by 180° prior to determining the range of acceptable orientation values for the embodiments illustrated in FIGS. 4 and 5.

FIGS. 6 and 7 are block diagrams that illustrate alternate embodiments of comparing a UE Elevation Value 642 with a Candidate Partner Device Elevation Value 622. The elevation of an entertainment system located on a second floor will be greater than the elevation of an entertainment system located on a first floor. In an embodiment, the elevation may be measured based on air pressure, and the measurement may be expressed in units of Pascals (such as kiloPascals (kPa)) or pounds per square inch (psi). In an embodiment, the range of acceptable elevation values may be expressed in units of kPa or psi so that a measured value may be directly compared with the acceptable range. In another embodiment, the measured kPa or psi units may be converted to a value expressed in alternate units such as feet above sea level, which is used herein for ease of explanation.

FIG. 6 illustrates comparing the UE Elevation Value 642 of UE 130 with a Range of Acceptable Elevations 640 that is determined based on the Candidate Partner Device Elevation Value 622 for Candidate Partner Device 112A. The lower bound of the range of acceptable elevations may be determined by the difference between the Candidate Partner Device Elevation Value 622 and a low threshold value. For example, if the Candidate Partner Device Elevation Value 622 were 25 ft. and a low threshold value were 3 ft., the lower bound of the Range of Acceptable Elevations 640 may be 22 ft. Similarly, if a high threshold value were 9 ft., the upper bound of the Range of Acceptable Elevations 640 may be 34 ft. The thresholds may be reversed if the candidate partner device is mounted high on a wall (i.e. greater distance to the floor, less distance to the ceiling). For example, the low elevation threshold may be 9 ft. and the high elevation threshold value may be 3 ft.

To determine whether UE 130 is on the same floor as the candidate partner device, the UE Elevation 642 may be compared with the Range of Acceptable Elevations 640 (in the example, [22 ft . . . 34 ft.]). If the UE Elevation 642 is between 22 ft. and 34 ft, then the UE and the Candidate Partner Device 112A may be considered to be located on the same floor. If the UE Elevation 642 does not lie within the acceptable elevation range, then the candidate partner device is not considered to be in a reasonable viewing position. For example, UE Elevation 642 does not lie within the Range of Acceptable Elevations 650 associated with Candidate Partner Device 112B.

FIG. 7 illustrates comparing the Candidate Partner Device Elevation Value 622 with a Range of Acceptable Elevations 740 that is determined based on the UE Elevation Value 642. The Candidate Partner Device Elevation Value 622 may be compared with the range of values, where the lower bound of the range may be determined by the difference between the UE Elevation Value 642 and a low threshold value, and the upper bound of the range may be determined by the sum of the UE Elevation Value 642 and a high threshold value. The low and high threshold values used to determine a Range of Acceptable Elevations 740 may differ from the low and high threshold values used to determine the Range of Acceptable Elevations 640 because the height above the floor at which UE 130 is expected to be carried may be different from the height above the floor of the candidate partner device. For example, if the UE is likely to be carried in a pocket 4 ft. above the floor, then the low threshold value may be 4 ft. and the high threshold value may be 8 ft.

When a UE is within beacon range of multiple candidate partner devices, one device may be selected that represents the device that is most probably the device with which the user intends to interact. Each device may be evaluated against an absolute standard to determine whether the device is a reasonable device to interact with. For example, determining that a device is located on a different floor may rule out the device being a reasonable partner candidate. Determining that the UE is facing away from a device may rule out that device as a reasonable candidate. Thus, even in the presence of one or more beacons, the UE may not select any device with which to interact if no device is a reasonable partner candidate.

Figure 8:
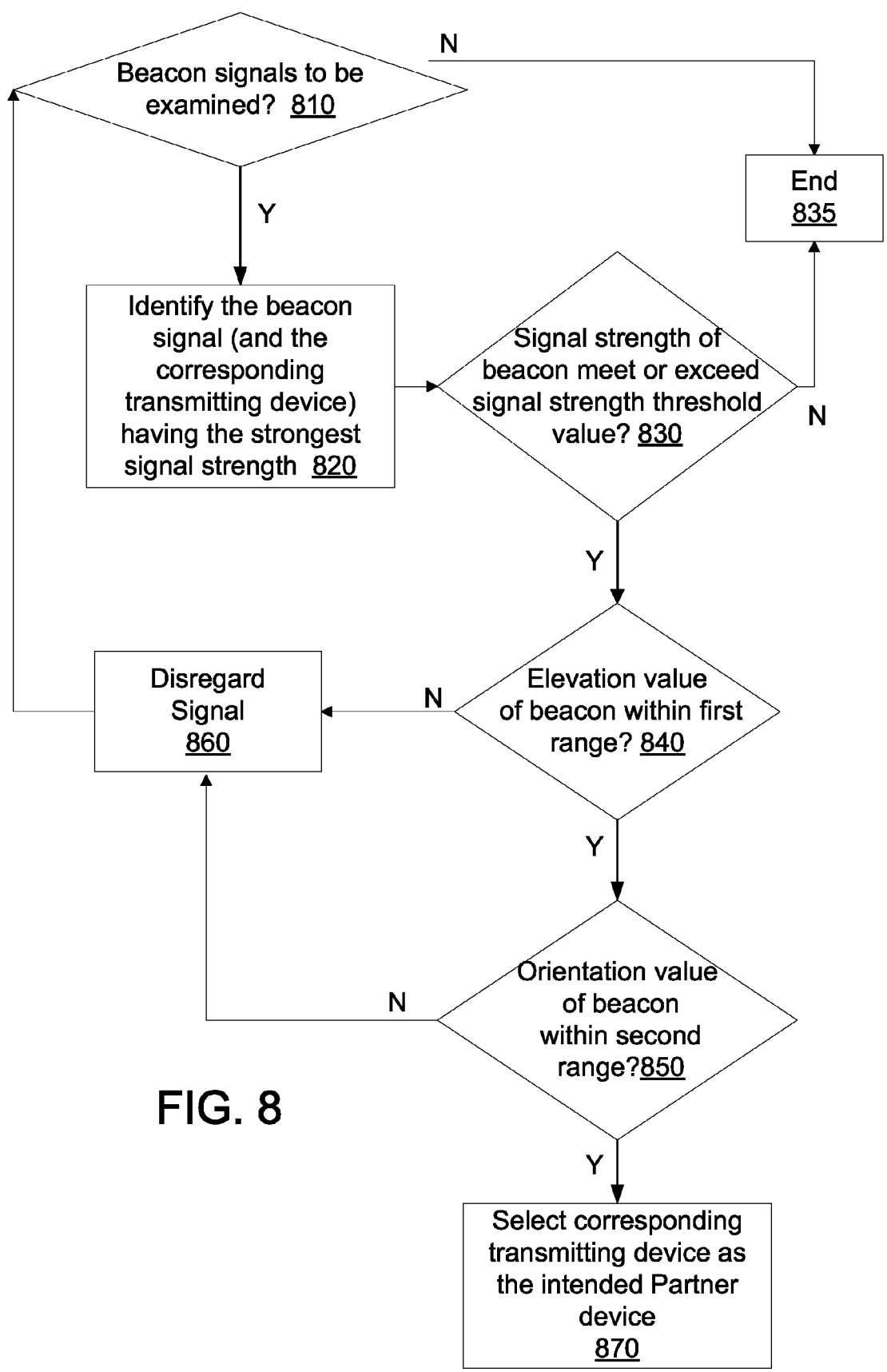
FIG. 8 is a flowchart that illustrates one embodiment for a UE selecting among multiple devices that emit beacons within range of the UE.

If there is more than one reasonable candidate device, then there are various embodiments for selecting the most reasonable device with the highest probability of being the intended partner device. FIG. 8 is a flowchart that illustrates one embodiment for a UE selecting among multiple devices that emit beacons within range of the UE. Starting at Step 810, a determination is made as to whether one or more beacon signals have been received that have not yet been examined/analyzed/evaluated. If there are none, then the process terminates at End 835. If there is at least one beacon signal to evaluate, then processing continues at Step 820 in which all of the unprocessed signals are assigned a signal strength value, and the beacon signal having the strong signal strength value is selected for further processing.

Next, at Step 830, the signal strength of the strongest signal identified in Step 820 is compared against an absolute signal strength threshold. Any signal having strength less than the absolute signal strength threshold may not considered strong enough to represent a reasonable partner candidate device. Thus, if the strongest beacon signal is not strong enough to represent a reasonable partner candidate device, then none of the other devices corresponding with weaker beacon signals will be reasonable either, so the process may end at 835. If the strongest signal is strong enough, then proceeding to Steps 840 and 850, the elevation and orientation values respectively may be tested against a range of reasonable values. Steps 840 and 850 may be performed in either order. If either the elevation or the orientation of the UE relative to the candidate partner device are outside of the reasonable range, then the flow moves to Step 860 where the candidate partner device associated with the current strongest signal may be eliminated from consideration, and the next strongest remaining beacon signal is evaluated, the process continuing until a reasonable partner device is found. If at Steps 840 and 850, the elevation value and/or the orientation value in the beacon indicate that the associated candidate partner device is a reasonable partner device, then flow continues to Step 870 where that candidate partner device may be selected as the intended partner device, and further evaluation of beacon signals may cease for some time period.

A person of ordinary skill in the art would recognize many different embodiments for analyzing the beacon signals when selecting a most reasonable candidate partner device. For example, each beacon signal may be evaluated for reasonableness against the absolute thresholds and computed acceptable ranges first, to rule out unreasonable candidates. Then the signal strengths of the remaining signals may be compared to select the best. Alternatively, determining the best candidate partner device may be a function of at least two of signal strength, elevation, and orientation. That may allow for a partner device that is very well positioned relative to a UE but having a weaker signal to be selected as the intended partner.

Figure 9:
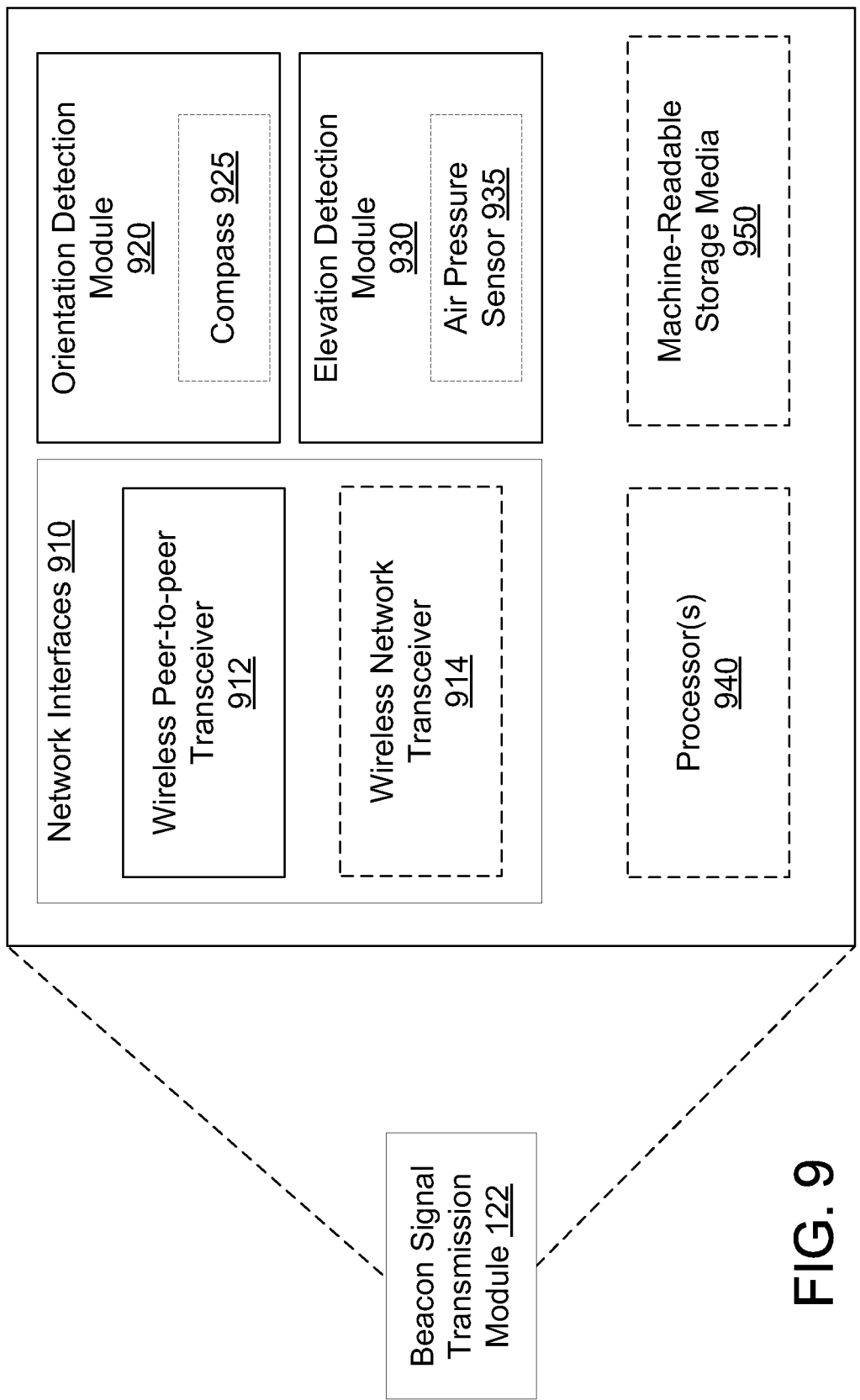
FIG. 9 is a block diagram that illustrates components of the Beacon Signal Transmission Module 122, according to an embodiment of the invention.

FIG. 9 is a block diagram that illustrates components of the Beacon Signal Transmission Module 122, according to an embodiment of the invention. The Beacon Signal Transmission Module 122 may comprise Network Interfaces 910, an Orientation Detection Module 920, and an Elevation Detection Module 930. The Network Interfaces 910 may include a Wireless Peer-to-Peer Transceiver 912 such as Bluetooth and an optional Wireless Network Transceiver 914 such as Wi-Fi. In an embodiment, the Orientation Detection Module 920 may comprise a compass 925 for measuring orientation. In an embodiment, the Elevation Detection Module 930 may comprise an air pressure sensor 935.

The Beacon Signal Transmission Module 122 may include its own processor 940 and/or Machine-Readable Storage Media 950 separate from those of the candidate partner device or other host. Alternatively, a host device such as a partner device may provide the processor(s) and/or machine-readable storage media for storing and executing instructions that control the Network Interfaces 910, Orientation Detection Module 920, and Elevation Detection Module 930 within the Beacon Signal Transmission Module 122.

Figure 10:
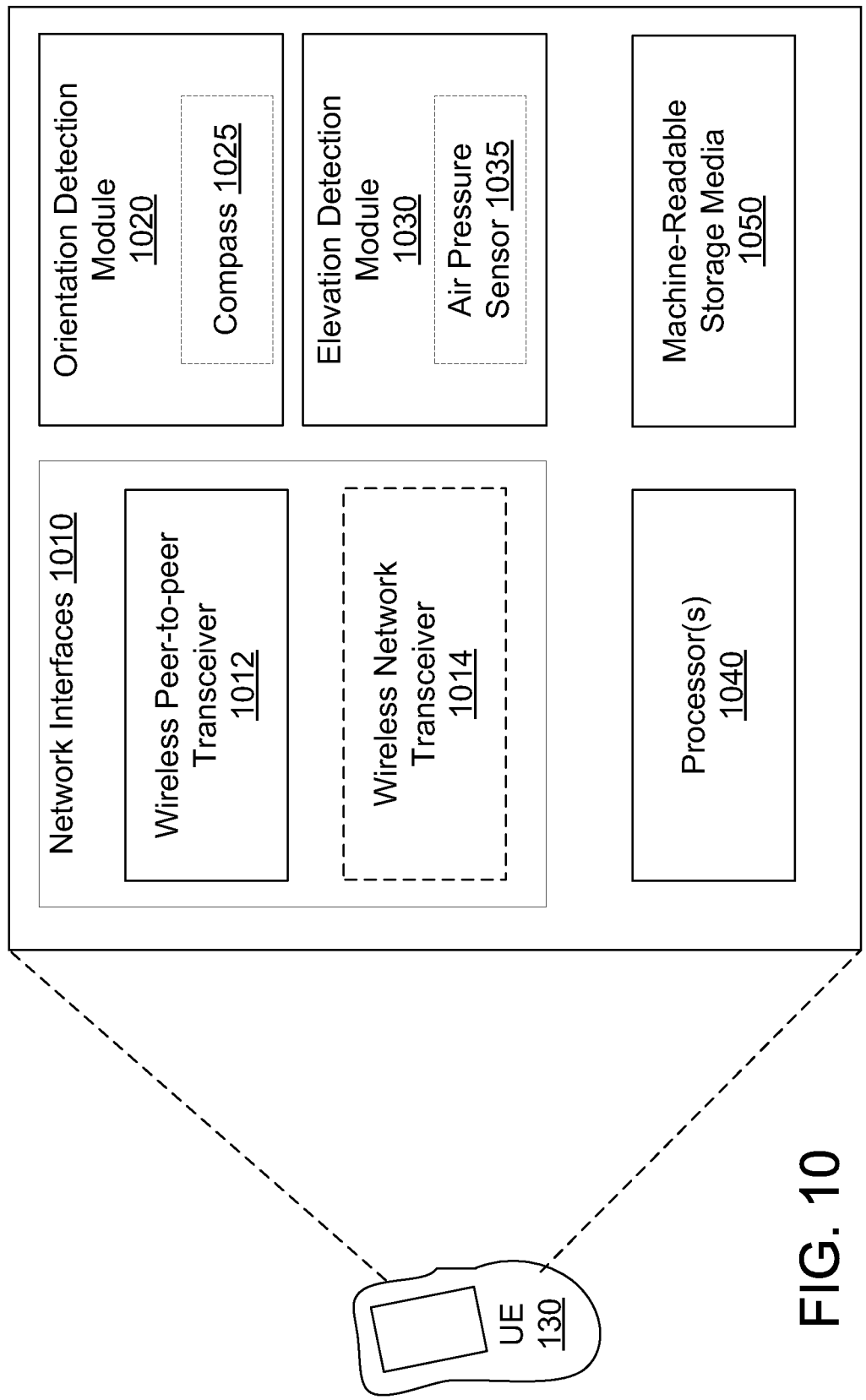
FIG. 10 is a block diagram that illustrates components of the UE 130, according to an embodiment of the invention.

The UE may include components similar to those of the Beacon Signal Transmission Module 122. FIG. 10 is a block diagram that illustrates components of the UE 130, according to an embodiment of the invention. The UE 130 may comprise Network Interfaces 1010, an Orientation Detection Module 1020, and an Elevation Detection Module 1030. The Network Interfaces 1010 may include a Wireless Peer-to-peer Transceiver 1012 such as Bluetooth and a Wireless Network Transceiver 1014 such as Wi-Fi. In an embodiment, the Orientation Detection Module 1020 may comprise a compass 1025 for measuring orientation. In an embodiment, the Elevation Detection Module 1030 may comprise an air pressure sensor 1035. The components of UE 130 described herein may be controlled by one or more processors 1040 that execute instructions stored in a Machine-Readable Storage Media 1050. The processors and machine-readable storage media may be components of the UE.

The UE may have a Bluetooth receiver for receiving and interpreting the signals from the entertainment system, a digital compass or other means for determining user orientation, and an air pressure sensor or other means for determining elevation. Bluetooth, digital compass, and air pressure sensor are called out as examples because many UE's are already equipped with such devices. However, any other orientation or elevation determining device may be used in the manner described herein.

Alternative Embodiments

In an embodiment, a TV may provide the display of content, the STB may select the personalized content to be displayed, and the viewer recognition support may be provided on a USB stick that plugs into a TV or a STB USB port. In an alternate embodiment, the viewer recognition support may be built directly into the TV or the STB. FIGS. 11A, 11B, 12A, 12B, and 12C are block diagrams that illustrate alternative configurations of hardware devices in the entertainment system, according to embodiments of the invention. Beacon Signal Transmission Module functions and set top box application may be implemented by different combinations of hardware devices: TV, STB, and USB stick.

Figure 11A:
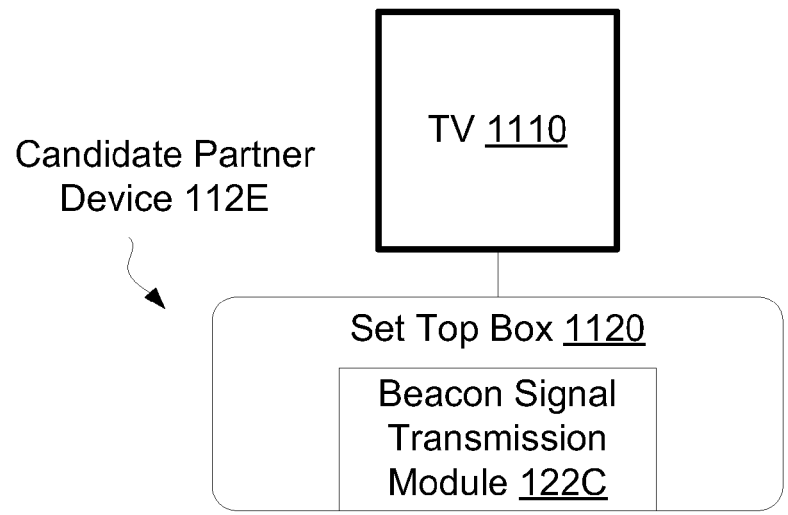
FIG. 11A is a block diagram that illustrates an alternative configuration of hardware devices in the entertainment system, according to embodiments of the invention.

FIG. 11A illustrates TV 1110 connected to Set Top Box 1120 that performs both the set top box application functionality as well as hosts the Beacon Signal Transmission Module 122C. The hardware device performing the set top box application functionality, which in FIG. 11A is Set Top Box 1120, is considered to be Candidate Partner Device 112E.

Figure 11B:
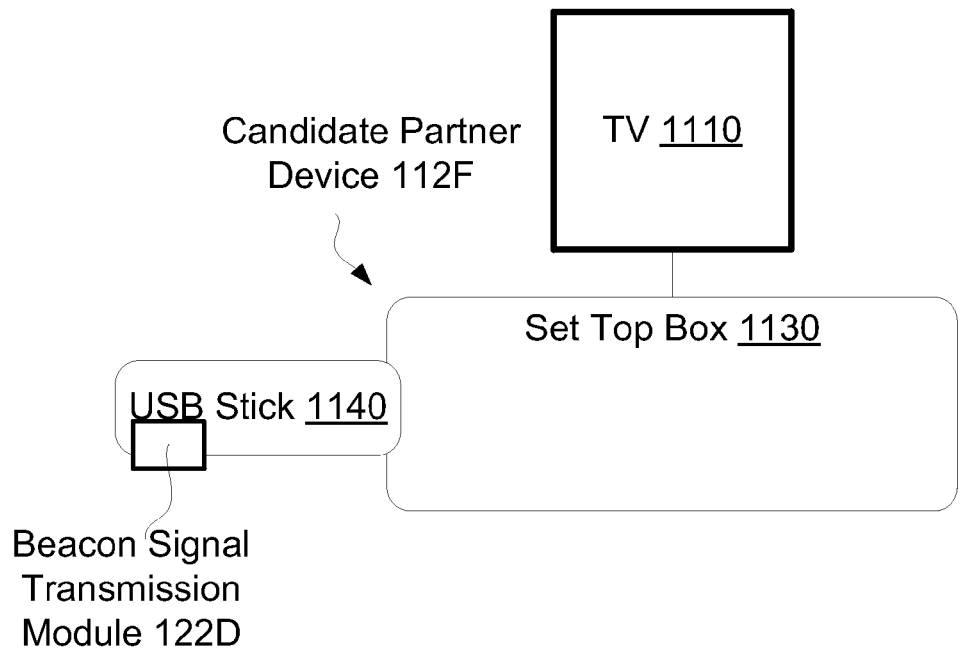
FIG. 11B is a block diagram that illustrates an alternative configuration of hardware devices in the entertainment system, according to embodiments of the invention.

FIG. 11B illustrates TV 1110 connected to a Set Top Box 1130 into which USB Stick 1140 has been plugged. The USB Stick 1140 hosts the Beacon Signal Transmission Module 122D, and the set top box performing the set top box application is considered to be Candidate Partner Device 112F.

Figure 12A:
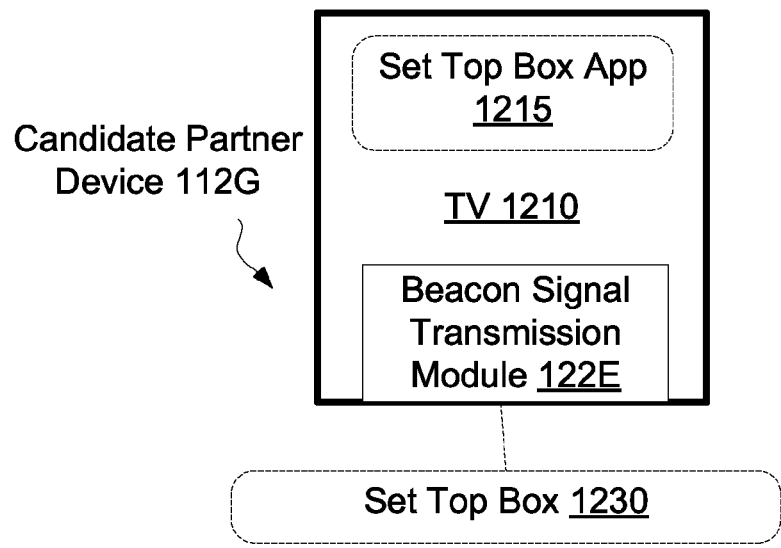
FIG. 12A is a block diagram that illustrates an alternative configuration of hardware devices in the entertainment system, according to embodiments of the invention.
Figure 12B:
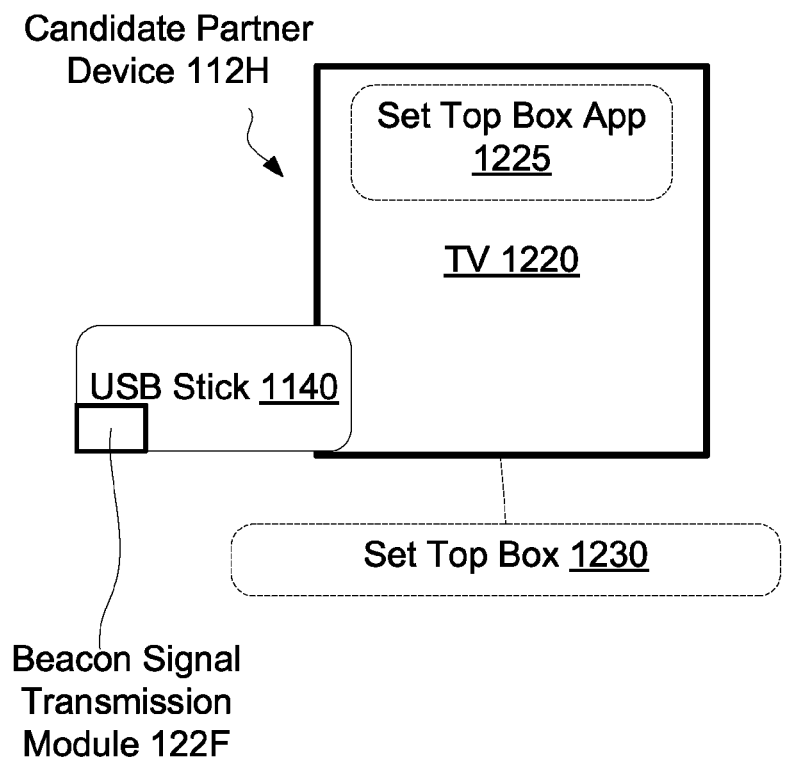
FIG. 12B is a block diagram that illustrates an alternative configuration of hardware devices in the entertainment system, according to embodiments of the invention.
Figure 12C:
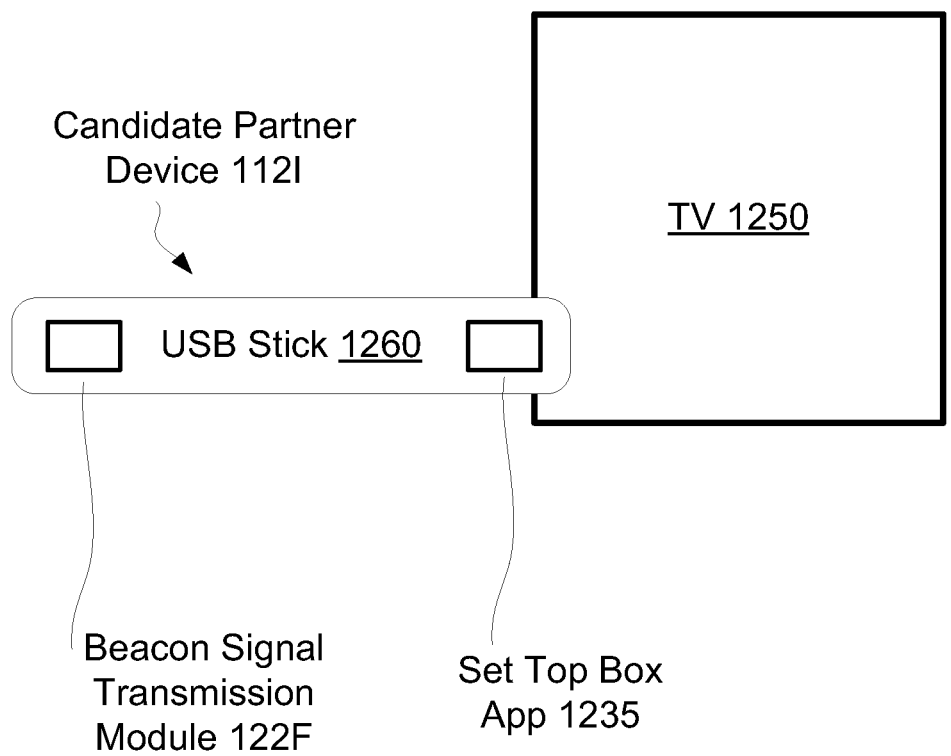
FIG. 12C is a block diagram that illustrates an alternative configuration of hardware devices in the entertainment system, according to embodiments of the invention.

The hardware configurations illustrated in FIGS. 12A, 12B, and 12C do not require a hardware device for the set top box 1230. FIG. 12A illustrates a Television 1210 hosting the Set Top Box Application 1215 and the Beacon Signal Transmission Module 122E, and thus, the television is considered to be the Candidate Partner Device 112G. FIG. 12B illustrates a Television 1220 hosting the set top box application and a USB Stick 1140 plugged into the television provides the Beacon Signal Transmission Module 122F. TV 1220 is considered to be the Candidate Partner Device 112H in this configuration. FIG. 12C illustrates the Set Top Box Application 1235 and the Beacon Signal Transmission Module 122F both provided by USB Stick 1260 that is plugged into TV 1250. In this configuration, the USB stick 1260 is considered to be the Candidate Partner Device 112I.

By placing advanced, value-added features on an inexpensive USB stick, the cost of manufacturing the TV and/or STB stays low, and the basic functionality offered may be complemented by the features provided by the USB stick.

The forgoing describes a cost-effective solution for a viewer to self-identify to an entertainment system that customizes content for the viewer. The solution ideally leverages existing mobile device capability and existing TV/STB installations in real-world living environments such as in an apartment building in which an individual apartment have a TV that is shared by multiple people, but neighbor's TVs are located just across a wall, floor, or ceiling.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 13:
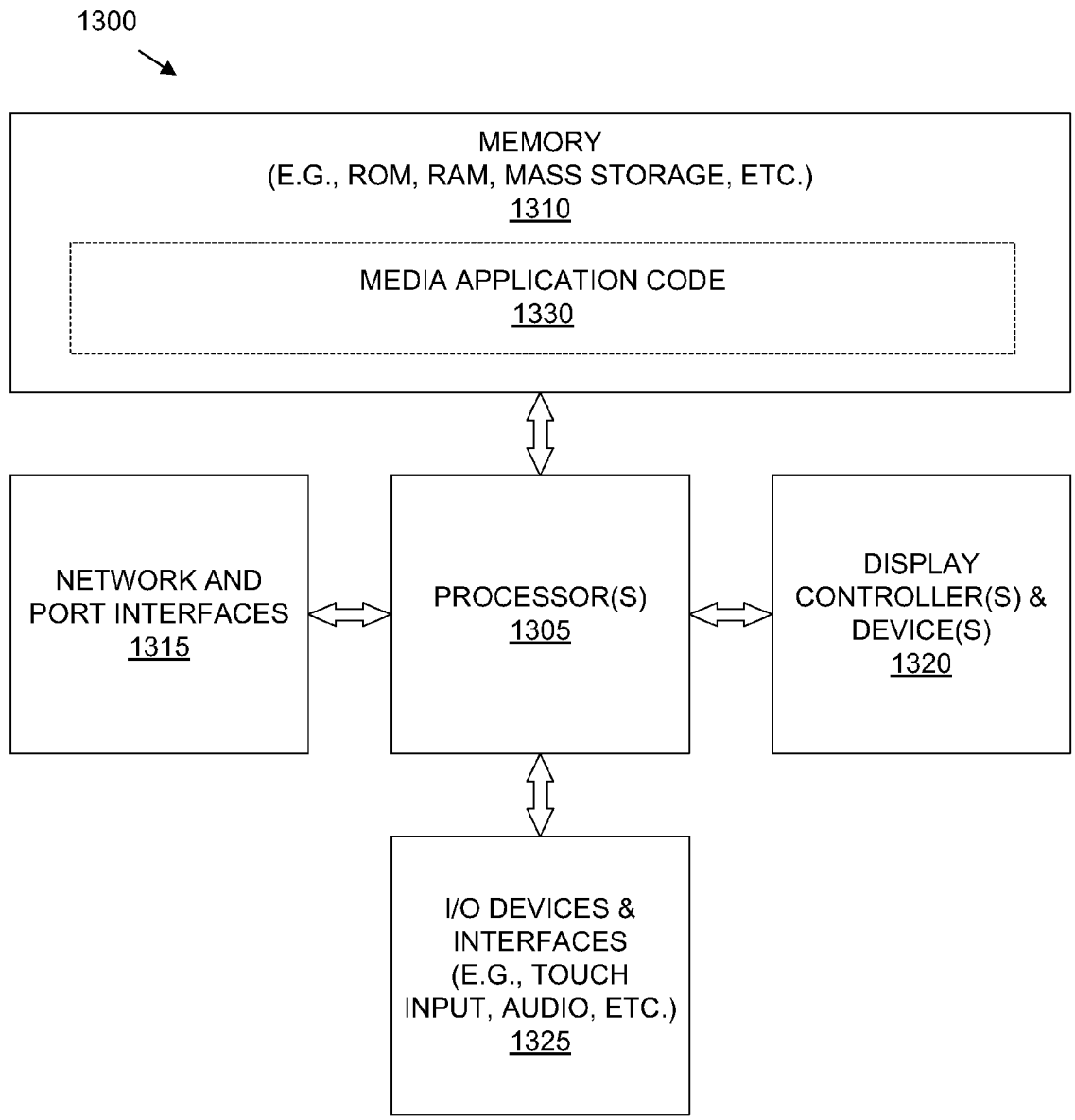
FIG. 13 illustrates a block diagram for an exemplary data processing system that may be used in some embodiments.

FIG. 13 illustrates a block diagram for an exemplary data processing system 1300 that may be used in some embodiments. Data processing system 1300 includes one or more microprocessors 1305 and connected system components (e.g., multiple connected chips). Alternatively, the data processing system 1300 is a system on a chip. One or more such data processing systems 1300 may be utilized to implement the functionality of the UE 130 and/or Candidate Partner Device 112, as illustrated in FIG. 1.

The data processing system 1300 includes memory 1310, which is coupled to the microprocessor(s) 1305. The memory 1310 may be used for storing data, metadata, and programs for execution by the microprocessor(s) 1305. For example, the depicted memory 1310 may store media application code 1330 that, when executed by the microprocessor(s) 1305, causes the data processing system 1300 to perform the operations described herein. The memory 1310 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1310 may be internal or distributed memory.

The data processing system 1300 also includes a display controller and display device 1320 that provides a visual user interface for the user, e.g., GUI elements or windows. The data processing system 1300 also includes one or more input or output ("I/O") devices and interfaces 1325, which are provided to allow a user to provide input to, receive output from, and otherwise transfer data to and from the system. These I/O devices 1325 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1300. The I/O devices and interfaces 1325 may also include a connector for a dock or a connector for a USB interface, FireWire, Thunderbolt, Ethernet, etc., to connect the system 1300 with another device, external component, or a network. Exemplary I/O devices and interfaces 1325 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1300 with another device, external component, or a network and receive stored instructions, data, tokens, etc. It will be appreciated that one or more buses may be used to interconnect the various components shown in FIG. 13.

For example, the data processing system 1300 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a wearable computing device (e.g., smartwatch, digital eyewear), or devices which combine aspects or functions of these devices, such as a media player combined with a PDA and a cellular telephone in one device. In other embodiments, the data processing system 1300 may be a network computer, server, or an embedded processing device within another device or consumer electronic product. As used herein, the terms computer, system, device, processing device, and "apparatus comprising a processing device" may be used interchangeably with the term data processing system 1300 and include the above-listed exemplary embodiments.

It will be appreciated that additional components, not shown, may also be part of the system 1300, and, in certain embodiments, fewer components than that shown in FIG. 13 may also be used in a data processing system 1300. For example, in some embodiments where the data processing system 1300 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1310 or other non-transitory machine-readable storage medium. The software may further be transmitted or received over a network (not shown) via a network and/or port interface 1315. In various embodiments, hardwired circuitry may be used in combination with the software instructions to implement the present embodiments. Thus, the techniques are not limited to any specific combination of hardware circuitry and software, or to any particular source for the instructions executed by the data processing system 1300.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a User Equipment (UE) device of a user for automatically determining an intended partner device that the user desires to interact with, the method comprising:
   determining a UE orientation value;
   determining a UE elevation value;
   receiving a beacon signal, wherein the beacon signal includes:
      a device identifier of a candidate partner device,
      a device elevation value that indicates an elevation of the candidate partner device, and
      a device orientation value that indicates an orientation of the candidate partner device;
   determining a signal strength value for the beacon signal;
   selecting the candidate partner device as the intended partner device based on at least:
      the signal strength value,
      the UE elevation value,
      the device elevation value that indicates the elevation of the candidate partner device,
      the device orientation value that indicates the orientation of the candidate partner device, and
      the UE orientation value; and
   transmitting a message to the intended partner device using the device identifier of the candidate partner device.

2. The method of claim 1, wherein said selecting the candidate partner device as the intended partner device comprises:
   determining that the signal strength value is greater than or equal to a signal strength threshold value.

3. The method of claim 1, wherein said selecting the candidate partner device as the intended partner device further comprises:
   determining that the device orientation value is within a first range of orientation values based at least on the UE orientation value; or
   determining that the UE orientation value is within a second range of orientation values based at least on the device orientation value.

4. The method of claim 1, further comprising:
   prior to said selecting the candidate partner device as the intended partner device, receiving a second beacon signal, wherein the second beacon signal includes:
      a second device identifier of a second candidate partner device,
      a second device elevation value that indicates an elevation of the second candidate partner device, and
      a second device orientation value that indicates an orientation of the second candidate partner device;
   determining a second signal strength value for the second beacon signal; and
   determining that the second candidate partner device is not the intended partner device based on one or more of:
      the second signal strength value,
      the second device orientation value that indicates the orientation of the second candidate partner device,
      the UE orientation value,
      the second device elevation value that indicates the elevation of the second candidate partner device, and
      the UE elevation value.

5. The method of claim 4, wherein said determining that the second candidate partner device is not the intended partner device comprises:
   determining that the second signal strength value is less than a signal strength threshold value.

6. The method of claim 4, wherein said determining that the second candidate partner device is not the intended partner device comprises:
   determining that the second signal strength value is greater than or equal to a signal strength threshold value; and
   determining that the UE orientation value is not within a range of orientation values that are based on the second device orientation value or that the UE elevation value is not within a range of elevation values that are based on the second device elevation value.

7. The method of claim 1, wherein said selecting the candidate partner device as the intended partner device further comprises:
   determining that the device elevation value is within a first range of elevation values based at least on the UE elevation value; or
   determining that the UE elevation value is within a second range of elevation values based at least on the device elevation value.

8. A non-transitory computer-readable storage medium storing instructions that, when executed by one or more processors, cause the one or more processors to perform operations comprising:
   automatically determining an intended partner device that a user desires to interact with, said automatically determining comprising:
      determining a UE orientation value;
      determining a UE elevation value;
      receiving a beacon signal, wherein the beacon signal includes:
         a device identifier of a candidate partner device;
         a device elevation value that indicates an elevation of the candidate partner device;
         a device orientation value that indicates an orientation of the candidate partner device;
      determining a signal strength value for the beacon signal;
   selecting the candidate partner device as the intended partner device based on at least:
      the signal strength value,
      the UE elevation value,
      the device elevation value that indicates an elevation of the candidate partner device,
      the device orientation value that indicates the orientation of the candidate partner device, and
      the UE orientation value; and
   transmitting a message to the intended partner device using the device identifier of the candidate partner device.

9. The non-transitory computer-readable storage medium of claim 8, wherein said selecting the candidate partner device as the intended partner device comprises:
   determining that the signal strength value is greater than or equal to a signal strength threshold value.

10. The non-transitory computer-readable storage medium of claim 8, wherein said selecting the candidate partner device as the intended partner device further comprises:
  determining that the device orientation value is within a first range of orientation values based at least on the UE orientation value; or
  determining that the UE orientation value is within a second range of orientation values based at least on the device orientation value.

11. The non-transitory computer-readable storage medium of claim 8, further storing additional instructions that when executed by the one or more processors, cause the one or more processors to perform additional operations comprising:
  prior to said selecting the candidate partner device as the intended partner device:
    receiving a second beacon signal, wherein the second beacon signal includes:
      a second device identifier of a second candidate partner device,
      a second device elevation value that indicates an elevation of the second candidate partner device, and
      a second device orientation value that indicates an orientation of the second candidate partner device;
    determining a second signal strength value for the second beacon signal; and
    determining that the second candidate partner device is not the intended partner device based one or more of:
      the second signal strength value,
      the second device orientation value that indicates the orientation of the second candidate partner device,
      the UE orientation value,
      the second device elevation value that indicates the elevation of the second candidate partner device, and
      the UE elevation value.

12. The non-transitory computer-readable storage medium of claim 11, wherein said determining that the second candidate partner device is not the intended partner device comprises:
  determining that the second signal strength value is not greater than or equal to a signal strength threshold value.

13. The non-transitory computer-readable storage medium of claim 11, wherein said determining that the second candidate partner device is not the intended partner device comprises:
  determining that the second signal strength value is greater than or equal to a signal strength threshold value; and
  determining that the UE orientation value is not within a range of orientation values that are based on the second device orientation value or that the UE elevation value is not within a range of elevation values that are based on the second device elevation value.

14. The non-transitory computer-readable storage medium of claim 8, wherein said selecting the candidate partner device as the intended partner device further comprises:
  determining that the device elevation value is within a first range of elevation values based at least on the UE elevation value; or
  determining that the UE elevation value is within a second range of elevation values based at least on the device elevation value.

15. A User Equipment (UE) device that is operative to automatically determine an intended partner device that a user desires to interact with, the UE device comprising:
  one or more network interfaces including at least one network interface operative to receive beacon signals, wherein each of the beacon signals includes:
    a device identifier of a corresponding candidate partner device,
    a device elevation value that indicates an elevation of the corresponding candidate partner device;
    a device orientation value that indicates an orientation of the corresponding candidate partner device;
  a compass operative to determine orientations of the UE device;
  an air pressure sensor operative to determine elevations of the UE device;
  one or more processors coupled to the one or more network interfaces, the compass, the air pressure sensor, and a non-transitory computer-readable storage medium, wherein the non-transitory computer-readable storage medium stores instructions that, when executed by the one or more processors, cause the one or more processors to perform operations comprising:
    determining a UE orientation value based on an orientation of the UE device determined by the compass;
    determining a UE elevation value based on an elevation of the UE device determined by the air pressure sensor;
    selecting a candidate partner device as the intended partner device based on at least:
      a signal strength value of a beacon signal,
      the device elevation value included in the beacon signal,
      the UE elevation value,
      the device orientation value included in the beacon signal, and
      the UE orientation value; and
    causing one of the one or more network interfaces to transmit a message to the intended partner device using the device identifier included in the beacon signal.

16. The UE device of claim 15, wherein said selecting the candidate partner device as the intended partner device comprises:
  determining that the signal strength value is greater than or equal to a signal strength threshold value.

17. The UE device of claim 15, wherein the non-transitory computer-readable storage medium further stores additional instructions that, when executed by the one or more processors, cause the one or more processors to perform additional operations comprising:
  determining that the device orientation value is within a first range of orientation values based on the UE orientation value; or
  determining that the UE orientation value is within a second range of orientation values based on the device orientation value.

18. The UE device of claim 15, wherein the non-transitory computer-readable storage medium further stores additional instructions that, when executed by the one or more processors, cause the one or more processors to perform additional operations comprising:
  prior to said selecting the candidate partner device as the intended partner device:
    receiving a second beacon signal, wherein the second beacon signal includes:
      a second device identifier of a second candidate partner device, a second device elevation value that indicates an elevation of the second candidate partner device, and a second device orientation value that indicates an orientation of the second candidate partner device;

determining a second signal strength value for the second beacon signal; and determining that the second candidate partner device is not the intended partner device based on one or more of:

the second signal strength value, the second device orientation value that indicates the orientation of the second candidate partner device, the UE orientation value, the second device elevation value that indicates the elevation of the second candidate partner device, and the UE elevation value.

19. The UE device of claim 18, wherein said determining that the second candidate partner device is not the intended partner device comprises:

determining that the second signal strength value is not greater than or equal to a signal strength threshold value.

20. The UE device of claim 18, wherein said determining that the second candidate partner device is not the intended partner device comprises:

determining that the second signal strength value is greater than or equal to a signal strength threshold value; and determining that the UE orientation value is not within a range of orientation values that are based on the second device orientation value or that the UE elevation value is not within a range of elevation values that are based on the second device elevation value.

21. The UE device of claim 15, wherein said selecting the candidate partner device as the intended partner device further comprises:

determining that the device elevation value is within a first range of elevation values based on the UE elevation value; or determining that the UE elevation value is within a second range of elevation values based on the device elevation value.

* * * * *